United States Patent
Rajewski

[19]

[11] Patent Number: 6,082,390
[45] Date of Patent: Jul. 4, 2000

[54] GAS BLANKET CONTROLLER

[76] Inventor: Robert C. Rajewski, R.R. #1, Donalda, Alberta, Canada, T0B 1H0

[21] Appl. No.: 09/168,314

[22] Filed: Oct. 7, 1998

[51] Int. Cl.[7] .................................................. G05D 16/06
[52] U.S. Cl. ........................... 137/209; 137/488; 137/492
[58] Field of Search .................................... 137/488, 492, 137/492.5, 209

[56] References Cited

U.S. PATENT DOCUMENTS

| 1,028,098 | 6/1912 | Delaney | 137/492 |
| 1,110,320 | 9/1914 | Fulton | 137/488 |
| 5,660,204 | 8/1997 | Piotrowski et al. | 137/492.5 |

*Primary Examiner*—Gerald A. Michalsky
*Attorney, Agent, or Firm*—Joseph W. Holland

[57] ABSTRACT

A gas blanket controller, comprising a housing defining a chamber sealed with a diaphragm on a first side of the chamber, and a fitting for a tank outlet on another side of the chamber; a rod secured to the diaphragm for movement with the diaphragm; a rod guide secured to the housing, the rod being guided by the rod guide; weights secured to the rod providing a force resisting movement of the rod; a control linkage secured to the rod; a microswitch mounted on the housing, the microswitch having a toggle that is actuated by the control linkage; a gas blanket supply line; a gas blanket motor control valve on the gas blanket supply line; a communication link between the microswitch and the gas blanket motor control valve; and the rod having a range of motion such that the toggle is operable by contact with the control linkage, whereby the microswitch opens and closes the gas blanket control valve upon operation of the toggle.

4 Claims, 2 Drawing Sheets

GAS BLANKET CONTROLLER

FIELD OF THE INVENTION

This invention relates to gas blanket controllers for controlling gas blanket pressure supplied to tanks.

BACKGROUND OF THE INVENTION

Gas blanket controllers are used to sense pressure in a tank and control the flow of blanket gas to the tank. In one prior art design, gas pressure is provided to one side of a diaphragm to which is attached a rod. The rod is biased by a spring and connects directly to a valve to control flow of blanket gas into the tank. This arrangement is somewhat cumbersome and the inventor considers it hard to adjust to a set pressure. A simpler, more dependable and more accurate design is desirable.

SUMMARY OF THE INVENTION

There is therefore provided in accordance with an aspect of the invention a gas blanket controller, comprising a housing defining a chamber sealed with a diaphragm on a first side of the chamber, and a fitting for a tank outlet on another side of the chamber; a rod secured to the diaphragm for movement with the diaphragm; a rod guide secured to the housing, the rod being guided by the rod guide; weights secured to the rod providing a force resisting movement of the rod; a control linkage secured to the rod; a microswitch mounted on the housing, the microswitch having a toggle that is actuated by the control linkage; a gas blanket supply line; a gas blanket motor control valve on the gas blanket supply line; a communication link between the microswitch and the gas blanket motor control valve; and the rod having a range of motion such that the toggle is operable by contact with the control linkage, whereby the microswitch opens and closes the gas blanket control valve upon operation of the toggle.

In accordance with another aspect of the invention, the communication link is a hydraulic line.

In accordance with another aspect of the invention, the control linkage comprises upper and lower stops on the rod, which may be formed of washers.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
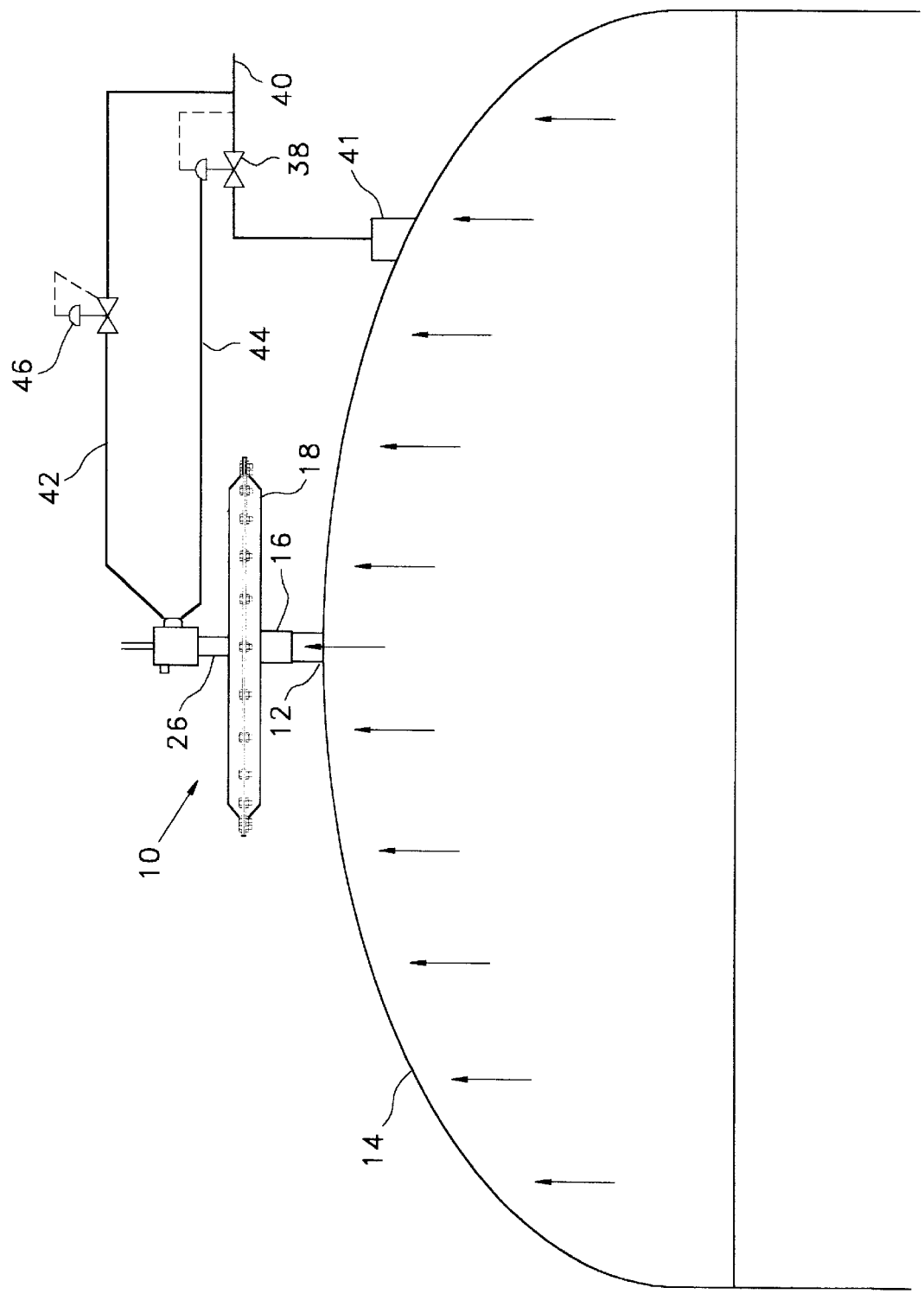
FIG. 1 is a schematic of a gas blanket controller according to the invention.
Figure 2:
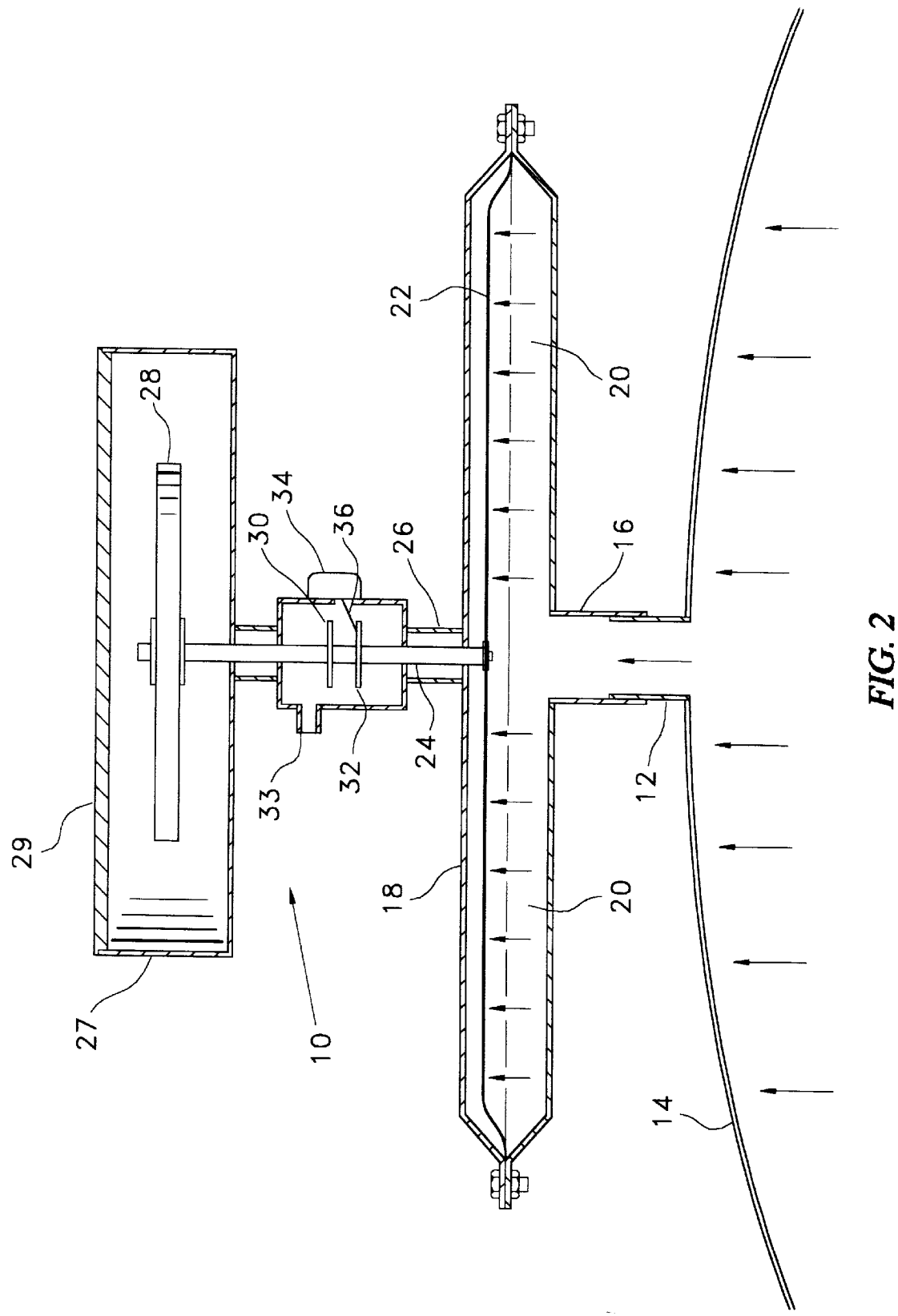
FIG. 2 is a schematic showing a detail of the inner workings of the gas blanket controller according to the invention

Referring to FIGS. 1 and 2, there is shown a gas blanket controller 10 attached to an outlet 12 of a tank 14 by a conventional fitting 16. The gas blanket controller 10 is formed of a housing 18 defining a chamber 20 sealed with a diaphragm 22 on a first side of the chamber 20. The fitting 16 is on the other side of the chamber. The diaphragm 22 itself is conventional, and moves up and down with variation in gas pressure in the tank 14.

A rod 24 is secured to the diaphragm 22 in conventional fashion so that the rod moves up and down as the diaphragm 22 moves with gas pressure in the tank 14. The rod 24 extends upward through a tube 26 that is secured to the housing 18. The tube 26 forms a guide for the rod. Weights 28 are secured to the rod 24 at one end to provide a force resisting movement of the rod 24 upward. Selection of the weights 28 permits accurate control of the tripping pressure of the gas blanket controller 10. Greater weight means greater pressure is required to move the rod 24. A compartment for the weights 28 is provided by a drum 27 secured to the tube 26, with the drum 27 being capped by a lid 29 that protects the controller 10 from the elements.

Washers 30 and 32 are secured to the rod 24 to form upper and lower stops of a control linkage. An air vent or breather hole 33 is provided in the tube 26 for venting the controller 10 above the diaphragm. A microswitch 34 is mounted on the tube 26, which itself is mounted on the housing 18. The microswitch 34 has a toggle 36 disposed between the washers 30 and 32. The microswitch 34 forms part of a control circuit for a gas blanket motor control valve 38 on a gas blanket supply line 40. The gas blanket supply line 40 is connected to a source of blanket gas (not shown) and is connected to the tank 14 through a conventional fitting 41. A communication link between the microswitch 34 and the gas blanket motor control valve 38 is formed by hydraulic lines 42 and 44, with line 42 providing pressure in and line 44 providing pressure out.

The rod 24 is provided with a range of motion such that the toggle 36 is operable by contact with the washers 30 and 32. The range of motion may be controlled by the selection of the weights. As the toggle 36 is moved from the on to off positions, the microswitch 34 opens and closes the gas blanket motor control valve 38 upon operation of the toggle 36.

An optional pressure regulator 46 may be provided on the pressure-in line 42. The gas blanket controller thus described may be set to all standard pressure settings starting at ½" W.C.

The microswitch, blanket gas motor control valve, and the control lines are all readily commercially available parts. As for example, the microswitch may be an Invalco™316 F1-221 microswitch, the motor control valve may be from any of various manufacturers such as Fisher or Kimray, and may have a size (eg 1", 2") to suit the intended application, and the diaphragm may be made of TEFLON™, VITON™ or other flexible, impermeable, inert material that is suitable for the kind of gases used in the intended application. The weights may be lead, carbon steel, stainless steel or coated carbon steel or other metals or coated materials, so long as they provide a weight for the rod and may be secured to the rod. Several weights should be used to allow selection of the desired on and off pressures.

Immaterial modifications to the invention described here are intended to fall within the scope of the invention.

The embodiments of the invention in which an exclusive property or privilege is claimed are defined as follows:

1. A tank and a gas blanket controller in combination, comprising:

a tank having a tank outlet;

a housing defining a chamber sealed with a diaphragm on a first side of the chamber, and a fitting for the tank outlet on another side of the chamber;

the housing being secured to the tank by the fitting;

a rod secured to the diaphragm for movement with the diaphragm;

a rod guide secured to the housing, the rod being guided by the rod guide;

weights secured to the rod providing a force resisting movement of the rod;

a control linkage secured to the rod;

a microswitch mounted on the housing, the microswitch having a toggle that is actuated by the control linkage;

a gas blanket supply line in fluid communication with the tank;

a gas blanket motor control valve on the gas blanket supply line;

a communication link between the microswitch and the gas blanket motor control valve; and the rod having a range of motion such that the toggle is operable by contact with the control linkage, whereby the microswitch opens and closes the gas blanket motor control valve upon operation of the toggle and controls fluid flow from the gas blanket supply line to the tank.

2. The tank and gas blanket controller of claim 1 in which the communication link is a fluid line.

3. The tank and gas blanket controller of claim 1 in which the control linkage comprises upper and lower stops on the rod.

4. The tank and gas blanket controller of claim 3 in which the upper and lower stops are formed of washers.

* * * * *